(12) United States Patent
Hong et al.

(10) Patent No.: US 10,698,264 B2
(45) Date of Patent: Jun. 30, 2020

(54) BACKLIGHT UNIT AND DISPLAY DEVICE HAVING THE SAME

(71) Applicant: Samsung Display Co., Ltd., Yongin-si, Gyeonggi-do (KR)

(72) Inventors: Seung Pyo Hong, Hwaseong-si (KR); Kyu Tae Park, Hwaseong-si (KR); Jun Hee Bae, Asan-si (KR); Byung Seo Yoon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/380,807

(22) Filed: Apr. 10, 2019

(65) Prior Publication Data
US 2019/0317367 A1  Oct. 17, 2019

(30) Foreign Application Priority Data
Apr. 16, 2018 (KR) .................. 10-2018-0044140

(51) Int. Cl.
*G09F 13/04* (2006.01)
*G02F 1/13357* (2006.01)

(52) U.S. Cl.
CPC .. *G02F 1/133611* (2013.01); *G02F 1/133606* (2013.01); *G02F 1/133608* (2013.01); *G02F 1/133603* (2013.01)

(58) Field of Classification Search
None
See application file for complete search history.

(56) References Cited

U.S. PATENT DOCUMENTS

| 9,488,856 B2 | 11/2016 | Li | |
|---|---|---|---|
| 2006/0028154 A1* | 2/2006 | Shimokawa | G02F 1/133604 315/307 |
| 2011/0103040 A1* | 5/2011 | Teragawa | G02F 1/133608 362/97.1 |
| 2011/0109844 A1* | 5/2011 | Go | G02F 1/133308 349/65 |

FOREIGN PATENT DOCUMENTS

KR  10-2017-0126562 A  11/2017

* cited by examiner

*Primary Examiner* — Vip Patel
(74) *Attorney, Agent, or Firm* — Lewis Roca Rothgerber Christie LLP

(57) ABSTRACT

A backlight unit and a display device including the same are provided. The backlight unit includes a light source; a mold frame configured to accommodate the light source and having a window frame shape with an opening therein; and a supporting member disposed on the mold frame and comprising an optical pattern, wherein the mold frame comprises a first sidewall, and an inclined surface protruding obliquely downward and inward from an inner side surface of the first sidewall, and wherein the supporting member is disposed on the inclined surface of the mold frame.

20 Claims, 12 Drawing Sheets

BACKLIGHT UNIT AND DISPLAY DEVICE HAVING THE SAME

CROSS-REFERENCE TO RELATED APPLICATION

This application claims priority to and the benefit of Korean Patent Application No. 10-2018-0044140 filed on Apr. 16, 2018 in the Korean Intellectual Property Office, the disclosure of which is incorporated herein by reference in its entirety.

BACKGROUND

1. Field

One or more aspects of example embodiments of the present disclosure relate to a backlight unit and a display device having the same.

2. Description of the Related Art

Display devices become more and more important as multimedia technology evolves. Display devices may be divided into (i.e., categorized as) a self-luminous display device which emits light by itself, and a light-receiving display device which requires a separate light source. Examples of light-receiving display devices include a liquid-crystal display device, an electrophoretic display device, an electro wetting display device, etc.

A light-receiving display device may include a display panel for controlling the transmittance of incident light, and a backlight unit for providing light to the display panel.

The backlight units are divided into (i.e., categorized as) a direct-lit backlight unit and an edge-lit backlight unit, depending on the arrangement of the light sources. The edge-lit backlight unit has a structure in which the light sources are disposed on one side of a light guide plate. The direct-lit backlight unit has a structure in which the light sources are disposed under the display panel. In a direct-lit backlight unit, an optical plate (such as a diffusion plate) is disposed above an LED light source in order to enhance the diffusability of light emitted from the LED light source.

SUMMARY

Aspects of example embodiments of the present disclosure provide a backlight unit that can improve luminance uniformity.

Aspects of example embodiments of the present disclosure also provide a display device with improved display quality.

It should be noted that objects of the present disclosure are not limited to the above-mentioned object; and other objects of the present disclosure will be apparent to those skilled in the art from the following descriptions.

According to some example embodiments of the present disclosure, a space between a mold frame and an optical plate is provided, so that the luminance at the edge of a display device can be increased. As a result, the luminance uniformity can be improved.

It should be noted that effects of the present disclosure are not limited to those described above and other effects of the present disclosure will be apparent to those skilled in the art from the following descriptions.

According to some example embodiments of the present disclosure, there is provided a backlight unit. The backlight unit may include a light source; a mold frame configured to accommodate the light source and having a window frame shape with an opening therein; and a supporting member disposed on the mold frame and comprising an optical pattern, wherein the mold frame comprises a first sidewall, and an inclined surface protruding obliquely downward and inward from an inner side surface of the first sidewall, and wherein the supporting member is disposed on the inclined surface of the mold frame.

In some example embodiments, the supporting member may include an upper surface oriented vertically to the first sidewall of the mold frame, and an inclined surface extended obliquely downward and inward at a same inclination angle as the inclined surface of the mold frame.

In some example embodiments, the optical pattern may be formed in the upper surface and/or the inclined surface of the supporting member.

In some example embodiments, the optical pattern may be formed by patterning at least one of the surfaces of the supporting member.

In some example embodiments, the optical pattern may have a prism or a lenticular shape.

In some example embodiments, the optical pattern may be extended in a same direction as a direction in which the supporting member is extended.

In some example embodiments, a thickness of the supporting member may increase in a direction away from the first sidewall of the mold frame.

In some example embodiments, the backlight unit further may include a coupling member disposed between the supporting member and the inclined surface of the mold frame.

In some example embodiments, the backlight unit further may include an optical plate disposed on the upper surface of the supporting member.

In some example embodiments, the optical pattern may be formed in the upper surface and be in direct contact with the optical plate.

In some example embodiments, a part of the optical pattern in contact with the optical plate may be parallel to the optical plate.

In some example embodiments, the supporting member is made of a transparent material.

In some example embodiments, the supporting member contains scattering particles.

According to some example embodiments of the present disclosure, there is provided a display device. The display device may include a display panel; and a backlight unit disposed below the display panel, wherein the backlight unit comprises: a light source; a mold frame configured to accommodate the light source and having a window frame shape with an opening therein; a supporting member disposed on the mold frame and comprising an optical pattern; and an optical plate disposed on the supporting member, wherein the mold frame comprises a first sidewall, and an inclined surface protruding obliquely downward and inward from an inner side surface of the first sidewall, and wherein the supporting member is disposed on the inclined surface of the mold frame.

In some example embodiments, the display device may further include a bottom cover disposed below the light source, wherein the supporting member comprises an upper surface oriented parallel to a bottom of the bottom cover, and an inclined surface extended obliquely downward and inward at a same inclination angle as the inclined surface of the mold frame.

In some example embodiments, the optical pattern may be formed in the upper surface and/or the inclined surface of the supporting member.

In some example embodiments, the optical pattern may be formed by patterning at least one of the surfaces of the supporting member.

In some example embodiments, the optical pattern may have a prism or a lenticular shape.

In some example embodiments, the optical pattern may be formed in the upper surface and is in direct contact with the optical plate.

In some example embodiments, the supporting member may be formed integrally with the mold frame.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
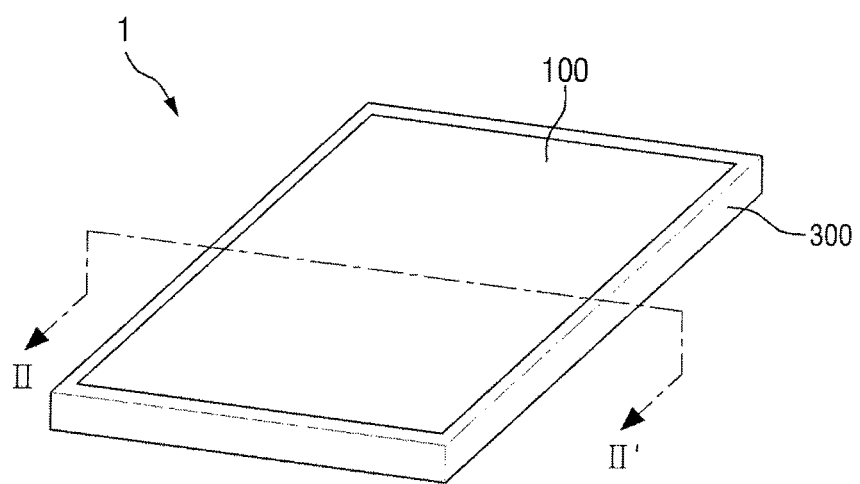
FIG. 1 is a perspective view of a display device according to some example embodiments of the present disclosure.

Hereinafter, example embodiments will now be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

In the drawings, thicknesses of a plurality of layers and areas may be illustrated in an enlarged manner for clarity and ease of description thereof.

It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that when an area or element is referred to as being "on," "connected to," or "coupled to" another area or element, it may be directly on, connected, or coupled to the other area or element, or intervening areas or elements may be present therebetween. Conversely, when an area or element is referred to as being "directly on," "directly connected to," or "directly coupled to" another area or element, there are no intervening areas or elements therebetween. In addition, it will also be understood that when an area or element is referred to as being "between" two areas or elements, it can be the only area or element between the two areas or elements, or one or more intervening areas or elements may also be present.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

When a certain embodiment may be implemented differently, a specific process order may be performed differently from the described order. For example, two consecutively described processes may be performed substantially at the same time or performed in an order opposite to the described order.

Expressions such as "at least one of," when preceding a list of elements, modify the entire list of elements and do not only modify the individual elements of the list. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

As used herein, the terms "substantially," "about," "approximately" and similar terms are used as terms of approximation and not as terms of degree, and are intended to account for the inherent deviations in measured or calculated values that would be recognized by those of ordinary skill in the art. Further, these terms as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Figure 2:
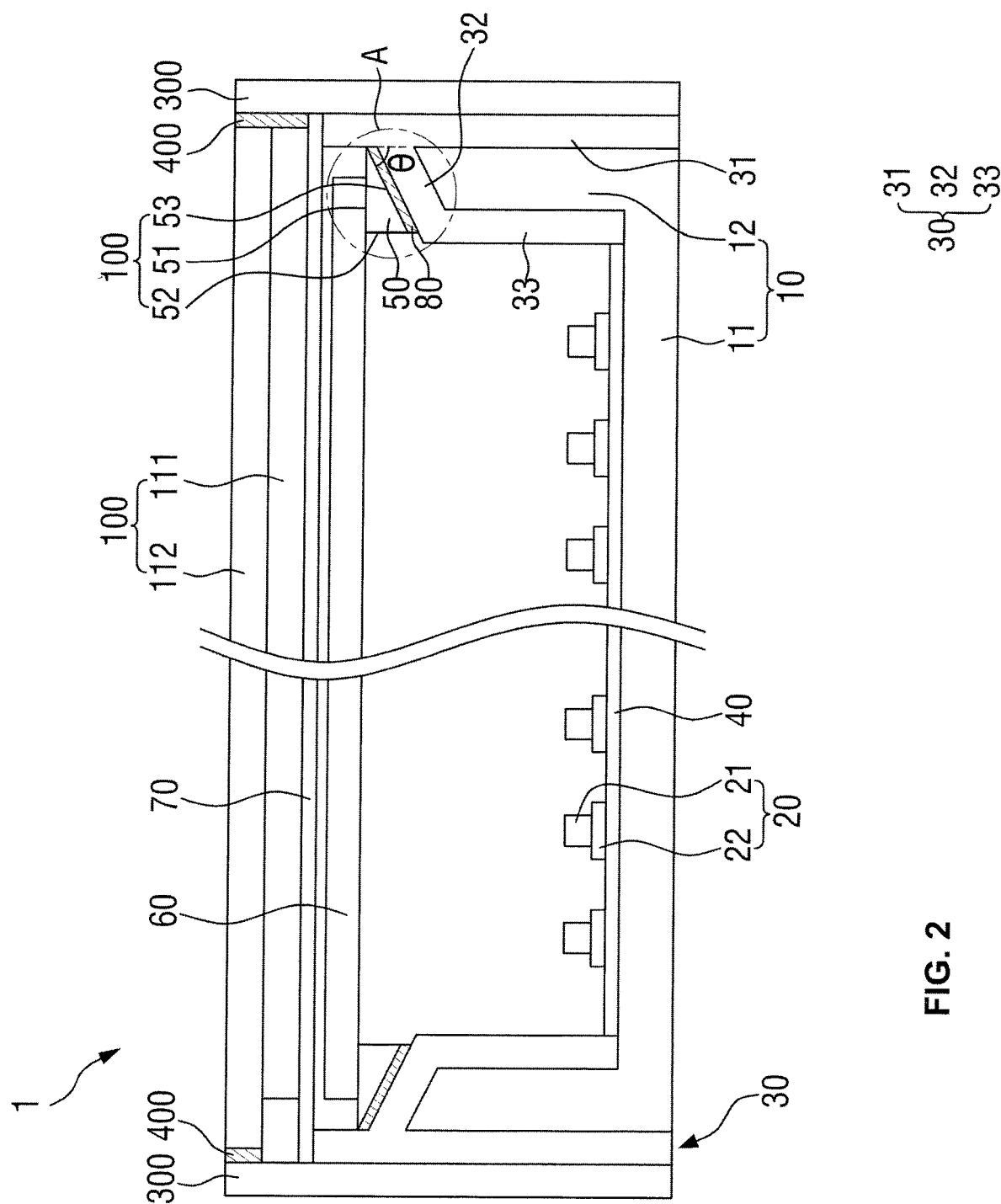
FIG. 2 is a cross-sectional view taken along line II-II' of FIG. 1.

FIG. 1 is a perspective view of a display device according to some example embodiments of the present disclosure. FIG. 2 is a cross-sectional view taken along line II-II' of FIG. 1.

Referring to FIGS. 1 and 2, the display device 1 may include a display panel 100, a backlight unit 200, and a top cover 300.

The display panel 100 may be a panel for displaying images. The display panel 100 receives light from the backlight unit 200 and displays images on the screen. Examples of the light-receiving display panel that receives light to display images include a liquid-crystal display panel, an electro wetting display panel, an electrophoretic display panel, a micro electro mechanical system (MEMS) display panel, and the like. Although a liquid-crystal display panel will be described as an example in the following description, any of a variety of other light-receiving display panels can be employed.

The display panel 100 may include a first substrate 111, a second substrate 112, and a liquid-crystal layer disposed between the first substrate 111 and the second substrate 112. The first substrate 111 and the second substrate 112 overlap with each other. In some embodiments, one of the substrates may be larger than the other substrate so that it may protrude further outward (e.g., laterally outward). For example, the second substrate 112 disposed above the first substrate 111 may be larger and protrude from one side of the first substrate 111 (e.g., outward relative to the first substrate 111). The protruding portion of the second substrate 112 may provide a space for mounting a driving chip or an external circuit board. It is, however, to be understood that the present disclosure is not limited thereto or thereby. The first substrate 111 disposed below the second substrate 112 may be larger and protrude outward (e.g., relative to the second substrate 112).

The backlight unit 200 is disposed below the display panel 100. The backlight unit 200 provides light to the display panel 100. As used herein, the terms "top" and "upper surface" refer to the side of the display panel 100 on which images are displayed, whereas the terms "bottom" and "lower surface" refer to the opposite side of the display panel 100, unless stated otherwise.

The backlight unit 200 includes a light source 20, a reflective sheet 40 that reflects light emitted from the light source 20, and an optical plate 60 and an optical sheet layer 70 that control optical characteristics of the emitted light.

The light source 20 may include either point light sources or line light sources. The point light sources may be light-emitting diode (LED) light source 21. A plurality of LED light sources 21 may be mounted on a printed circuit board 22.

The reflective sheet 40 is disposed under the light sources 20 to reflect the light emitted downward from the light sources 20 toward the upper side (i.e., toward the optical plate 60).

The optical plate 60 and the optical sheet layer 70 are disposed above the light sources 20. The optical plate 60 may be a diffusion plate for diffusing light incident from the light sources 20. It is, however, to be understood that the present disclosure is not limited thereto or thereby. For example, the optical plate 60 may be a wavelength conversion plate for changing the wavelength of light incident from the light sources 20. The wavelength conversion plate may contain wavelength conversion particles and/or diffusion particles. The optical sheet layer 70 diffuses, polarizes and/or condenses incident light. The optical sheet layer 70 may be formed by combining two or more optical sheets each having at least one of the above-described functions or the like. Examples of possible combinations of optical sheets may include a prism film, a diffusion film, a microlens film, a lenticular film, a polarizing film, a reflective polarizing film, a retardation film, and the like. The optical sheet layer 70 may further include a protective sheet if necessary or desired.

The backlight unit 200 may include a bottom cover 10 and a mold frame 30 for receiving or accommodating the light sources 20, the reflective sheet 40, the optical plate 60 and the optical sheet layer 70 described above.

The bottom cover 10 has an open face or opening and includes a bottom 11 and sidewalls 12 connected to the bottom 11. The light sources 20 and the reflective sheet 40 may be accommodated in a space defined by the bottom 11 and the sidewalls 12. The respective sidewalls 12 of the bottom cover 10 may be inserted and fixed in a space between a first sidewall 31 and a second sidewall 33 of the mold frame 30 to be described more fully later.

The mold frame 30 has a window frame shape with an opening at its center and may include the first sidewall 31, an inclined surface 32 extended obliquely downward (e.g., downward toward the bottom 11) and inward (e.g., inward toward the center of the display device 1) from an upper portion of the first sidewall 31, and the second sidewall 33 extended from the inclined surface 32. A lower side of the mold frame 30 has an opening, and an empty space is defined by the first sidewall 31, the inclined surface 32 and the second sidewall 33 configured to receive the sidewall 12 of the bottom cover 10. The sidewall 12 of the bottom cover 10 may be inserted into the empty space of the mold frame 30 as described above.

The inclined surface 32 of the mold frame 30 protrudes from a location of the first sidewalls 31 below the top by a certain (e.g., set) distance. The first sidewall 31 of the mold frame 30 may be divided into an upper portion and a lower portion with respect to the inclined surface 32. The optical plate 60 may be disposed in a space defined by the upper portion of the first sidewall 31, the inclined surface 32 and a supporting member (e.g., a support) 50. The supporting member 50 will be described in more detail later.

Figure 4:
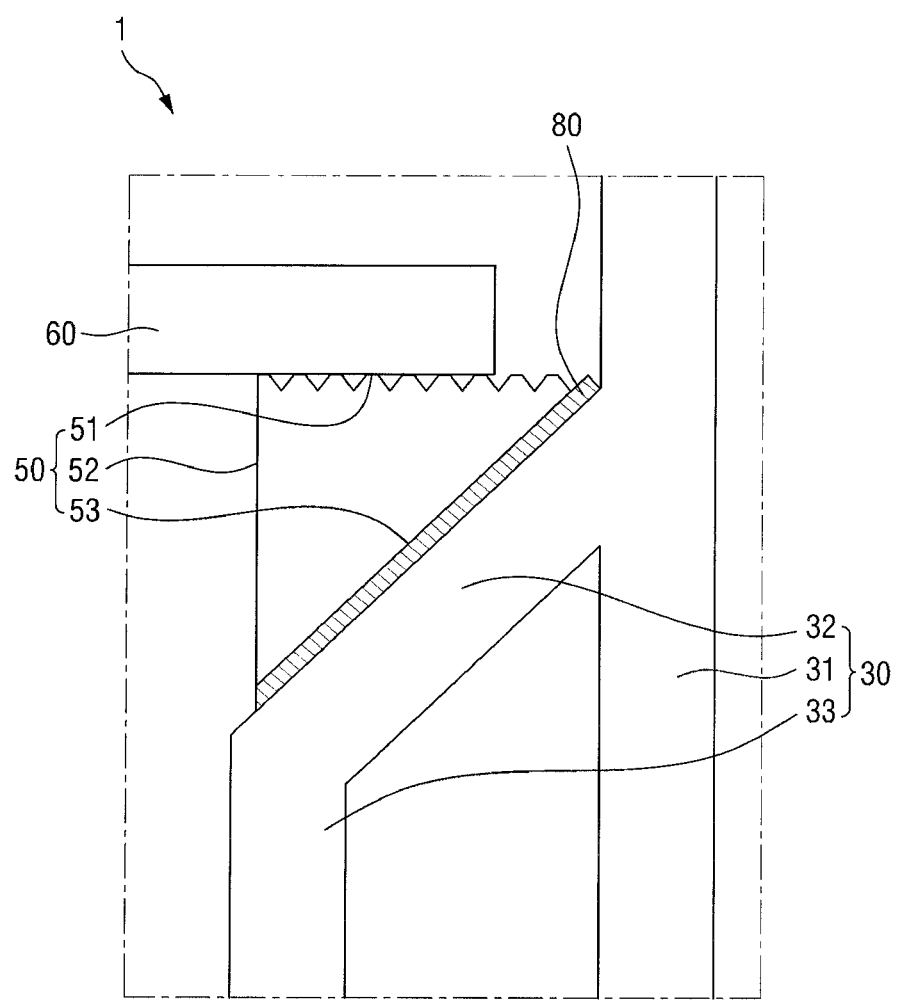
FIG. 4 is an enlarged view of portion A of FIG. 2.

The inclined surface 32 of the mold frame 30 is not in contact with the optical plate 60 (e.g., spaced apart), and thus an empty space may be formed between the inclined surface 32 of the mold frame 30 and the optical plate 60 (see FIG. 4). The light emitted from the light sources 20 may travel toward the edge of the display panel 100 through the empty space between the inclined surface 32 and the optical plate 60. That is, the inclined surface 32 of the mold frame 30 is oriented obliquely downward and inward with respect to the first sidewall 31, instead of being perpendicular to the first sidewall 31, thereby improving the luminance of the edge portion of the display panel 100. Specifically, if the inclined surface 32 of the mold frame 30 is oriented perpendicular to the first sidewall 31 and parallel to the bottom 11 of the bottom cover 10, the inclined surface 32 may disturb the propagation of the light emitted from the light source 20. As a result, the amount of light reaching the edge portion of the display panel 100 is reduced. When this happens, the edge portion of the display panel 100 has a lower luminance than the central portion, such that a dark spot may be formed at the edge portion. In contrast, when the inclined surface 32 of the mold frame 30 is oriented obliquely downward with respect to the first sidewall 31, the path of the light emitted from the light source 20 is not disturbed by the inclined surface 32, such that the light can travel toward the edge portion of the display panel 100 along the inclined surface 32. Accordingly, the luminance uniformity of the display panel 100 can be improved and a dark spot issue at the edge may be overcome.

The smaller the inclination angle θ of the inclined surface 32 is, the larger the empty space between the inclined surface 32 and the optical plate 60 becomes. Therefore, more light passes through the empty space to be incident on the edge portion of the display panel 100 as the inclination angle θ decreases. It is to be noted that if the inclination angle θ of the inclined surface 32 is too small, it may be difficult to secure the supporting member 50 as described in more detail later. In view of the above, the inclination angle θ of the inclined surface 32 may be approximately 30° to 60° relative to the first sidewall 31.

Although the inclined surface 32 of the mold frame 30 is shown as a single plane in the drawing in FIG. 2, this is merely illustrative. The inclined surface 32 of the mold frame 30 may be formed of two different planes or a curved surface.

The supporting member 50 is disposed on the inclined surface 32 of the mold frame 30 to support the optical plate 60. The inclined surface 32 of the mold frame 30 is disposed such that it is inclined downward and inward with respect to the first sidewall 31, and thus it is difficult to provide a sufficient face for supporting the optical plate 60 (e.g., on the inclined surface 32). The supporting member 50 supplements the inclined surface 32 of the mold frame 30 so that the optical plate 60 can be supported stably. That is, the upper surface 51 of the supporting member 50 is perpendicular to the first sidewall 31 and is disposed parallel to the bottom 11 of the bottom cover 10, to provide a sufficient face for supporting the optical plate 60. Hereinafter, the supporting member 50 will be described in detail with reference to FIGS. 3 and 4.

Figure 3:
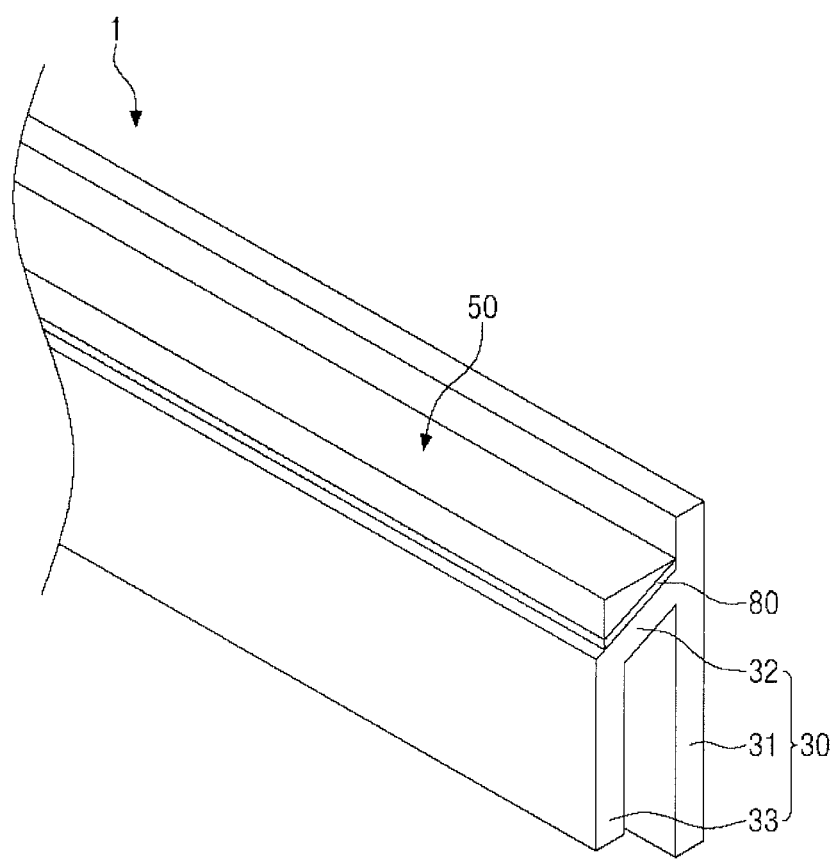
FIG. 3 is a perspective view of a portion of a mold frame and a supporting member according to some example embodiments of the present disclosure.

FIG. 3 is a perspective view of a portion of a mold frame and a supporting member according to some example embodiments of the present disclosure. FIG. 4 is an enlarged view of portion A of FIG. 2.

Referring to FIGS. 3 and 4, the supporting member 50 has a triangular prism shape and is extended in the same direction as the direction in which the inclined surface 32 of the mold frame 30 is extended. It is to be understood that the shape of the supporting member 50 is not limited to the above example. The supporting member 50 may have any shape as long as it can provide a sufficient face for supporting the optical plate 60. In the following description, the supporting member 50 has a triangular prism shape as an example.

The cross-sectional shape of the supporting member 50 is a right triangle and may include an upper surface 51, a side surface 52 extending perpendicularly to the upper surface 51, and an inclined surface 53. The upper surface 51 may be disposed perpendicular to the first sidewall 31 and parallel to the bottom 11 of the bottom cover 10, as described above. The upper surface 51 of the supporting member 50 is positioned below the top surface of the first sidewall 31 of the mold frame 30. The distance between the upper surface 51 of the supporting member 50 and the top surface of the first sidewall 31 may be equal to or greater than the thickness of the optical plate 60 so that the upper surface of the optical plate 60 disposed on the supporting member 50 does not protrude from the first sidewall 31.

The thickness of the supporting member 50 may increase away from the first sidewall 31 of the mold frame 30. That is, the inclined surface 53 of the supporting member 50 and the inclined surface 32 of the mold frame 30 may have the same inclination angle.

The side surface 52 of the supporting member 50 may be aligned with the inner side surface of the second sidewall 33 or may be disposed as shown in FIG. 4 to be more to the outside than the inner side surface of the second sidewall 33 (i.e., the side surface 52 is further away from the center of the display device 1 than the inner side surface of the second sidewall 33). The inner side surface of the second sidewall 33 refers to one of the side surfaces of the second sidewall 33 that is closer to the center of the display device 1 than the other side surface of the second sidewall 33. If the side surface 52 of the supporting member 50 is disposed more to the inside than the inner side surface of the second sidewall 33 of the mold frame 30 (i.e., closer to the center of the display device 1), the path of light may be unnecessarily disturbed by the supporting member 50. Therefore, the side surface 52 of the supporting member 50 may not be disposed more to the inner side than the inner side surface of the second sidewall 33. It is, however, to be understood that the present disclosure is not limited thereto or thereby. For example, the side surface 52 of the supporting member 50 may be disposed more to the inside than the inner side surface of the second sidewall 33. Then, the supporting member 50 may contain scattering particles to facilitate the diffusion of light.

The supporting member 50 may be made of a transparent or semi-transparent material, to transmit the light emitted from the light source 20 to the display panel 100. For example, the supporting member 50 may be made of PMMA (polymethylmethacrylate), PC, PET, or the like.

The supporting member 50 may contain scattering particles. The scattering particles can change the traveling angle of the light emitted from the light source 20 to guide the light to the edge portion where the amount of light is relatively insufficient. The scattering particles may be made of, but is not limited to, silicon, $TiO_2$, $SiO_2$, ZnO, $ZrO_2$, $AlO_2$, Al, Ag, or a combination thereof. The scattering particles may also be made of various materials having scattering properties.

The upper surface 51 of the supporting member 50 may include an optical pattern. The optical pattern can diffuse light. The light incident on the side surface 52 of the supporting member 50 may exit through the upper surface 51 of the supporting member 50. In doing so, the light is diffused by the optical pattern in the upper surface 51 of the supporting member 50, so that uniform light can be incident on the optical plate 60.

The optical pattern may be formed by patterning the upper surface 51 of the supporting member 50. It is, however, to be understood that the present disclosure is not limited thereto or thereby. The optical pattern may be formed by applying a resin onto the supporting member 50 or may be formed by attaching a film to the supporting member 50.

The optical pattern of the upper surface 51 of the supporting member 50 may be, for example, a lenticular pattern or a prism shape. It is, however, to be understood that the present disclosure is not limited thereto or thereby. The optical pattern may have any shape for diffusing light such as a pattern of hemispherical dots. In the following description, the optical pattern of the upper surface 51 of the supporting member 50 has a prism shape as an example. It is to be understood that the above-mentioned various shapes can be applied.

The optical pattern of the upper surface 51 of the supporting member 50 may be extended in the same direction as the direction in which the supporting member 50 is extended. The upper surface of the optical pattern may be flat. That is, the cross-sectional shape of each of the recesses of the optical pattern may be trapezoidal. The upper surface of the optical pattern may be in direct contact with the optical plate 60. By forming the upper surface of the optical pattern as flat, the optical plate 60 can be supported more stably and scratches on the optical plate 60 can be prevented.

The optical pattern may be formed only on a portion of the upper surface 51 of the supporting member 50. Specifically, the optical pattern may start from a location distant from the side surface 52 of the supporting member 50 to reach the inclined surface 53. In other words, the portion of the upper surface 51 in contact with the side surface 52 of the supporting member 50 may have a flat surface shape, while the portion of the upper surface 51 in contact with the inclined surface 53 of the supporting member 50 may have an inclined surface shape.

The supporting member 50 may be secured to the inclined surface 32 of the mold frame 30 by a coupling member (e.g., a coupler) 80. The coupling member 80 may include a polymer resin, an adhesive tape, or the like, and may have adhesive on both sides like a double-sided tape.

When the optical plate 60 is a diffusion plate, the diffusion coefficient of the optical plate 60 may be larger than the diffusion coefficient of the supporting member 50. If the diffusion coefficient of the supporting member 50 is too large, the light may not travel to the edge portion of the display panel 100 but diffuses to other portions. As a result, the amount of light reaching the edge portion of the display panel 100 may be reduced.

Referring back to FIGS. 1 and 2, the optical sheet layer 70 is disposed on the upper surface of the first sidewall 31 of the mold frame 30. As the upper surface of the first sidewall 31 is spaced apart from the upper surface 51 of the supporting member 50. there may be a space between the optical plate 60 and the optical sheet layer 70.

The top cover 300 may have a rectangular frame shape with open top and bottom faces. The top cover 300 covers the outer side surface of the mold frame 30 and covers the side surfaces of the display panel 100. It is to be noted that the top cover 300 may not cover the edge of the upper surface of the display panel 100, and the entire upper surface of the display panel 100 may be exposed to the outside, thereby reducing the bezel area.

The display panel 100 is disposed adjacent to the upper end of the sidewalls of the top cover 300, and they may be coupled with each other by a panel coupling means 400. The panel coupling means 400 may include a polymer resin, an adhesive tape, or the like. The panel coupling means 400 can prevent light from leaking to the edge portion of the display panel 100 by blocking the light transmission. For example, the panel coupling means 400 may include a light-absorbing material such as a black pigment or a dye, or may include a reflective material.

Hereinafter, supporting members according to other example embodiments will be described. In the following description, the same or similar elements will be denoted by the same or similar reference numerals, and redundant descriptions will be omitted or briefly described. Descriptions will be made focusing on differences from the above exemplary embodiment.

Figure 5:
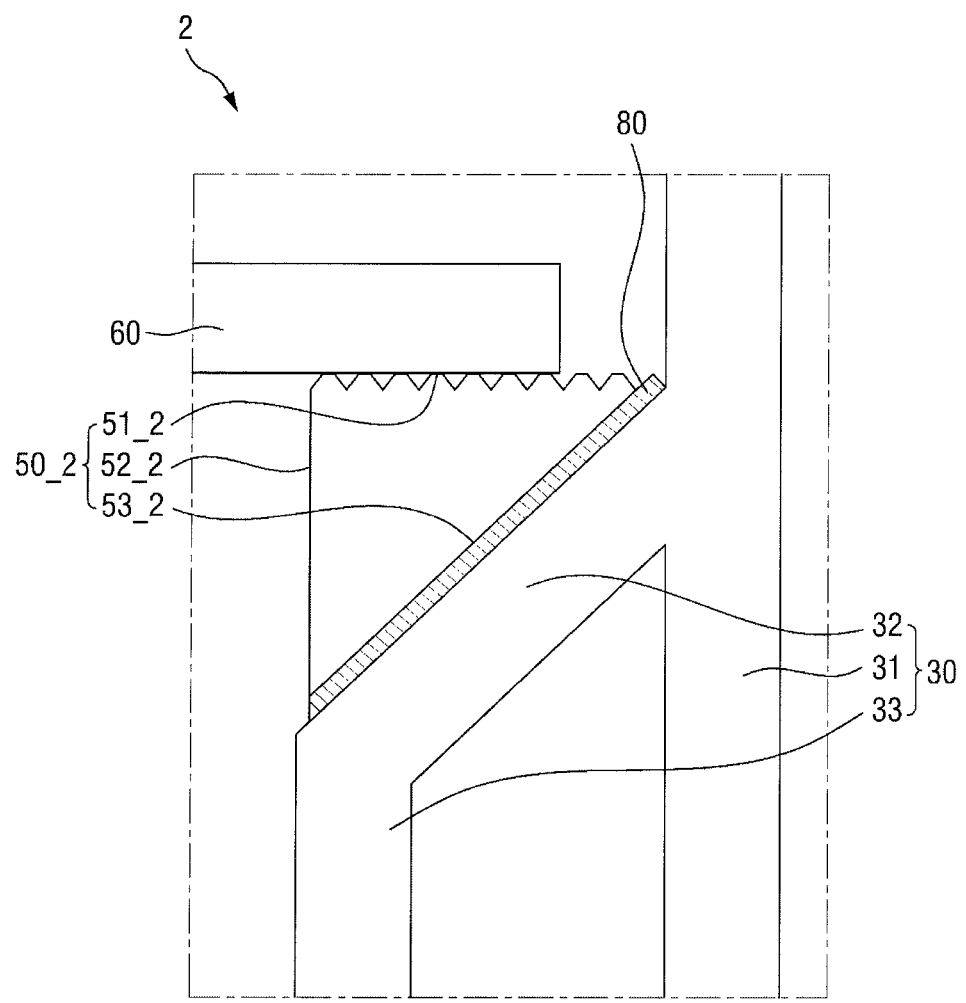
FIGS. 5 and 6 are cross-sectional views of panel coupling members according to other example embodiments.
Figure 6:
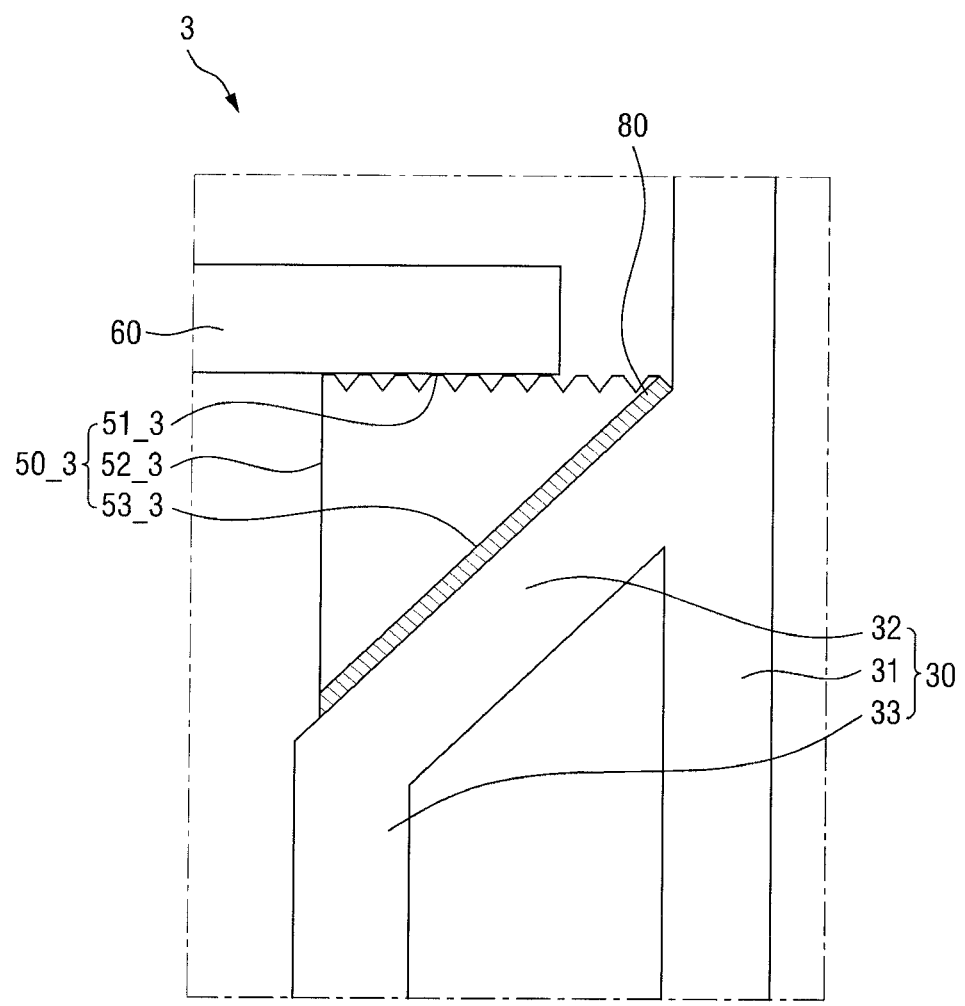

FIGS. 5 and 6 are cross-sectional views of panel coupling members according to other example embodiments.

Referring to FIG. 5, a supporting member (e.g., a support) 50_2 of a display device 2 may include an optical pattern on the entire upper surface 51_2.

The optical pattern may start from an area where the upper surface 51_2 and a side surface 52_2 of the supporting member 50_2 are in contact with each other. In this case, the side surface 52_2 of the supporting member 50_2 is connected to the optical pattern.

Referring to FIG. 6, the optical pattern formed in a supporting member (e.g., a support) 50_3 of a display device 3 may be disposed spaced apart from a side surface 52_3 and an inclined surface 53_3.

In the area where the upper surface 51_3 is connected to the side surface 52_3 of the supporting member 50_3, the upper surface 51_3 may have a flat shape. In addition, in the area where the upper surface 51_3 is connected to the inclined surface 53_3, the upper surface 51_3 may have a flat shape.

Figure 7:
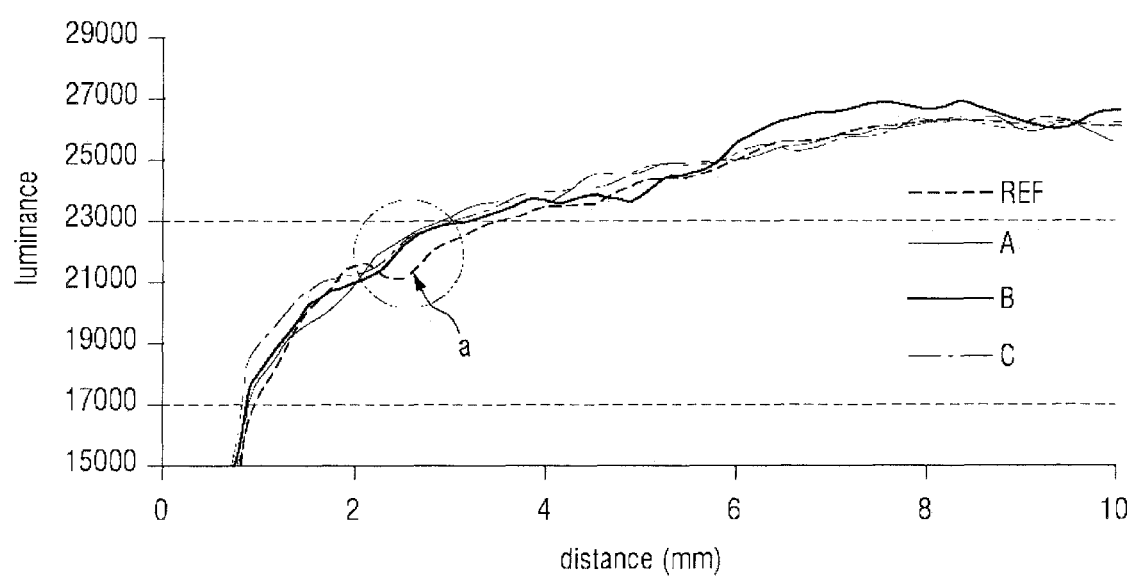
FIG. 7 is a graph showing the luminance of an edge portion of the display devices according to the example embodiments of FIGS. 4 to 6.

FIG. 7 is a graph showing the luminance of the edge portion of the display devices according to the example embodiments of FIGS. 4 to 6. The x-axis represents distance in mm from the end of the display panel 100, and the y-axis represents the luminance of the light observed on the display panel 100.

In order to experimentally measure the effects of overcoming the dark spot issue at the edge portion of the display panel 100 depending on the shapes of the supporting members 50, 50_2, and 50_3 in FIGS. 4 to 6, four display devices including supporting members of different shapes, respectively, were prepared. First, as a Comparative Example, a display device REF with a supporting member not including an optical pattern was prepared. As other display devices, the display device 1 including the supporting member 50 of FIG. 4 (indicated by line A), the display device 2 including the supporting member 50_2 of FIG. 5 (indicated by line B), and the display device 3 including the supporting member 50_3 of FIG. 6 (indicated by line C) were prepared.

It can be seen from the graph of FIG. 7 that the luminance of the display device REF according to the Comparative Example drops sharply in Region a. In this case, a dark spot where the luminance is lower than the other areas may be perceived on the display panel.

In contrast, it can be seen that the display devices 1, 2 and 3 according to the example embodiments of FIGS. 4 to 6 exhibit uniform luminance. Particularly, the display device 1 according to the example embodiment of FIG. 4 exhibits a gentle curve without luminance drop, thereby achieving a uniform luminance.

Figure 8:
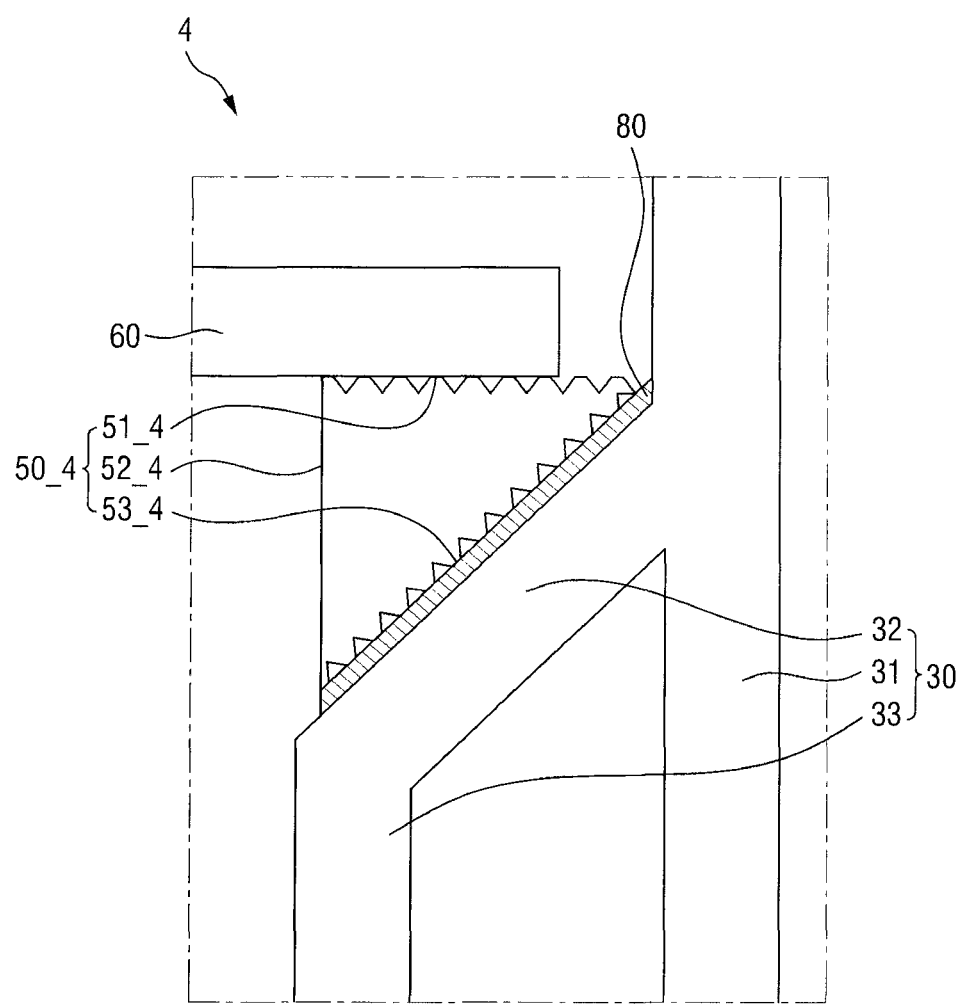
FIGS. 8 to 9 are cross-sectional views of support members according to other example embodiments of the present disclosure.
Figure 9:
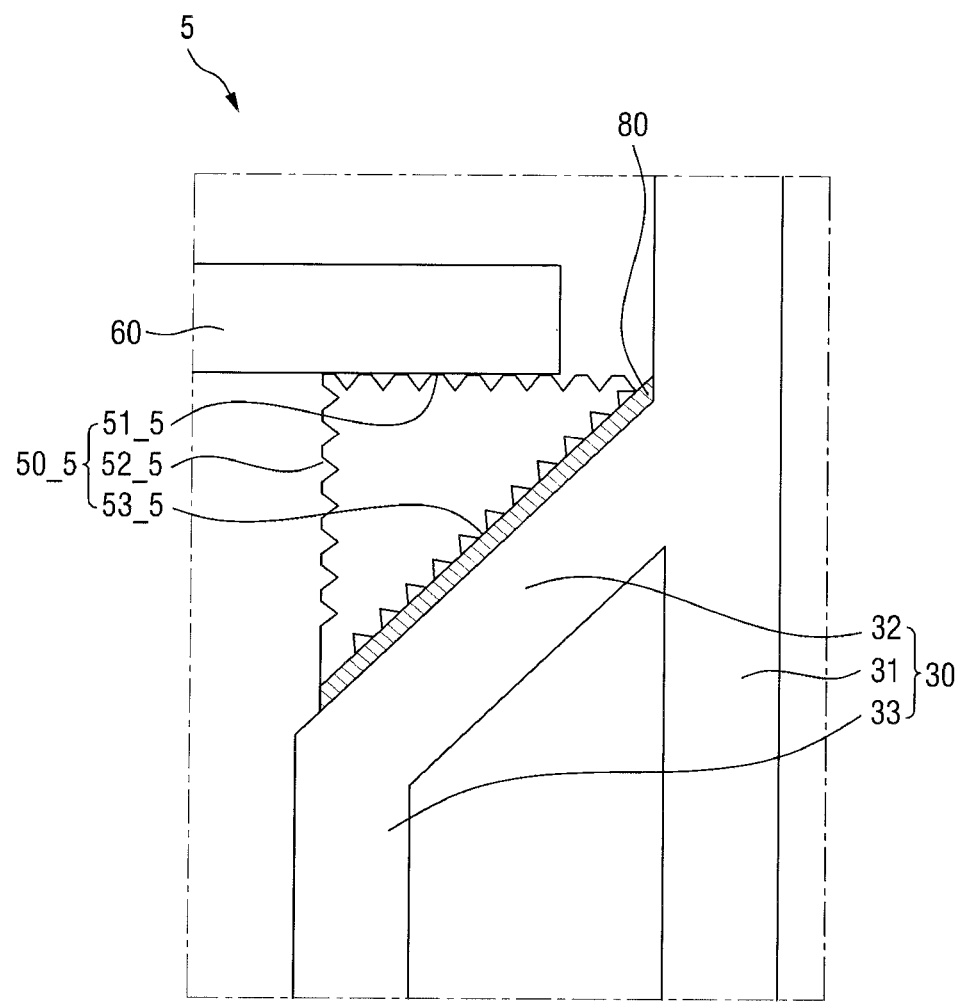

FIGS. 8 to 9 are cross-sectional views of supporting members according to other example embodiments of the present disclosure.

Referring to FIG. 8, a supporting member (e.g., a support) 50_4 of a display device 4 may include optical patterns in an inclined surface 53_4 as well as in an upper surface 51_4.

The light incident on the side surface 52_4 of the supporting member 50_4 may be diffused and refracted at the inclined surface 53_4 firstly and may be diffused secondarily through the upper surface 51_4. In this case, since the light is diffused twice, the luminance uniformity can be further improved.

Referring to FIG. 9, a supporting member (e.g., a support) 50_5 of a display device 5 may include optical patterns in an upper surface 51_5, an inclined surface 53_5, and a side surface 52_5.

The light passing through the supporting member 50_5 may be diffused and refracted three times in total through the side surface 52_3, the inclined surface 53_4 and the upper surface 51_5, and accordingly the luminance uniformity of the edge portion of the display device 5 can be increased.

Although the optical patterns formed in the surfaces of the supporting members 50_4 and 50_5 of the display devices 4 and 5 have the same shape in FIGS. 8 and 9, this is merely illustrative. For example, a prism-like optical pattern may be formed in the upper surfaces 51_4 and 51_5 of the supporting members 50_4 and 50_5, and an optical pattern having a lenticular shape may be formed in the inclined surfaces 53_4 and 53_5.

Figure 10:
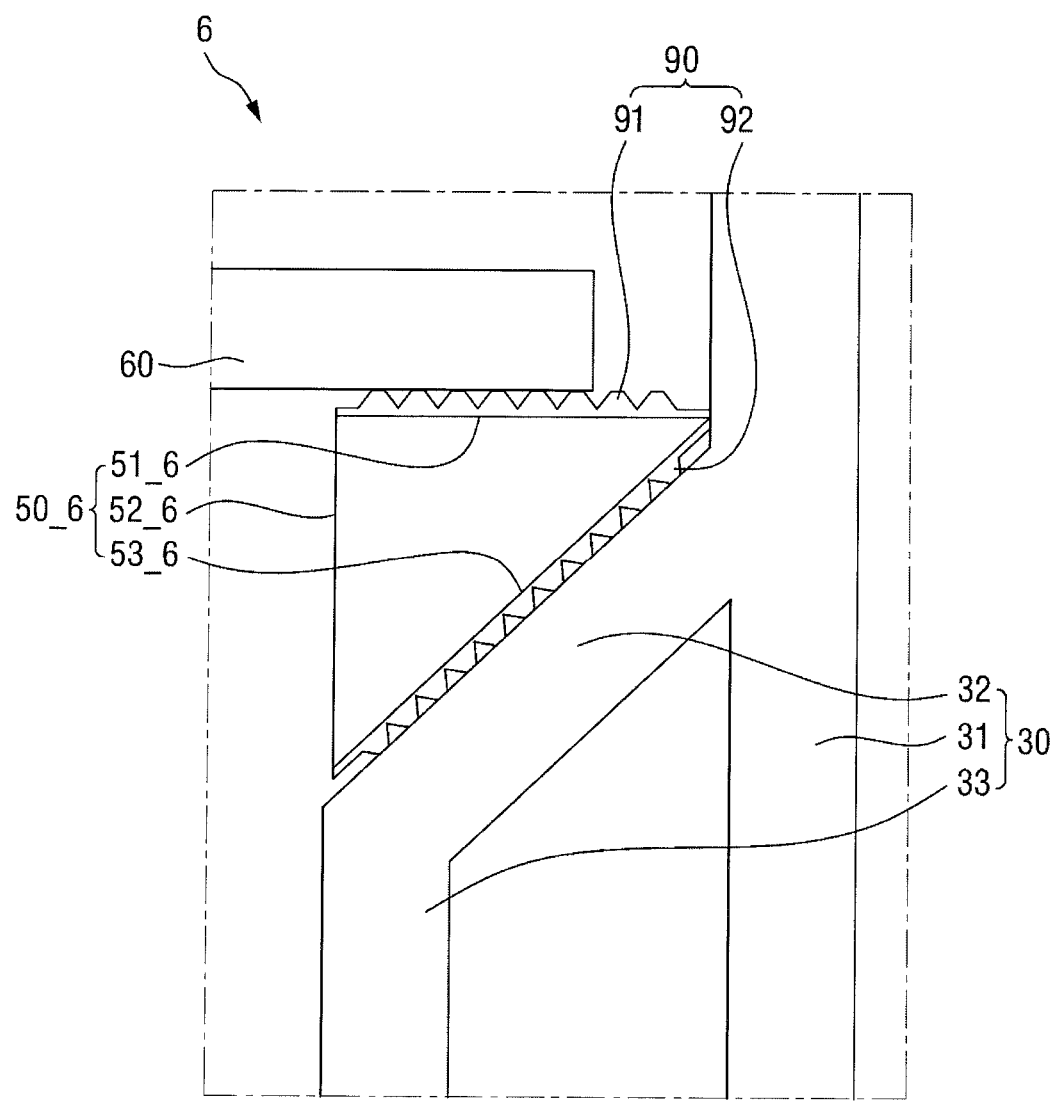
FIG. 10 is a cross-sectional view of a support member according to yet other example embodiments of the present disclosure.

FIG. 10 is a cross-sectional view of a supporting member according to yet other example embodiments of the present disclosure.

Referring to FIG. 10, a display device 6 may include diffusion members 90 disposed on an upper surface 51_6 and an inclined surface 53_6 of a supporting member (e.g., a support) 50_6. Specifically, the diffusion members 90 of the display device 6 may include a first diffusion member 91 disposed on the upper surface 51_6 of the supporting member 50_6, and a second diffusion member 92 disposed on the inclined surface 53_6 of the supporting member 50_6. Although FIG. 10 shows that the diffusion members 90 are disposed on the upper surface 51_6 and the inclined surface 53_6 of the supporting member 50_6, this is merely illustrative. The diffusion members 90 may be disposed only on the upper surface 51_6 of the supporting member 50_6, or on all of the upper surface 51_6, a side surface 52_6 and the inclined surface 53_6.

The diffusion members 90 may have, for example, a prism shape, a lenticular shape, and the like. The shape of the diffusion members 90 may be substantially identical to the optical pattern shape formed on the surface of the supporting members 50 to 50_5 according to the example embodiments according to FIGS. 1 to 9.

The diffusion members 90 may have an adhesive force. Then, the diffusion members 90 may be coupled with the supporting member 50_6 without an additional adhesive member.

When the diffusion members 90 have an adhesive force, the coupling member (e.g., the coupler or adhesive member) 80 for coupling the supporting member 50_6 with the mold frame 30 may be eliminated, and the supporting member 50_6 may be coupled with the mold frame 30 through the second diffusion member 92.

Figure 11:
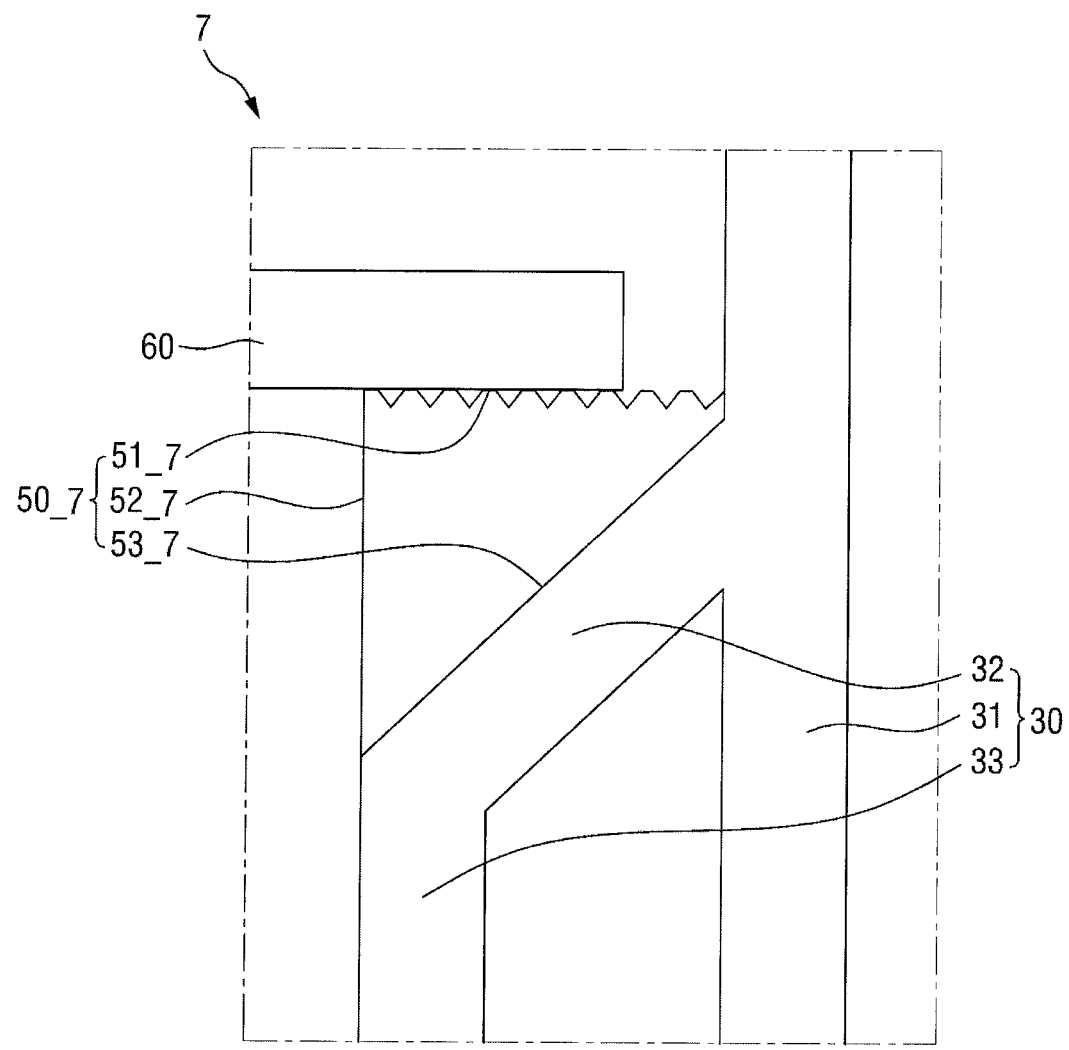
FIG. 11 is a cross-sectional view of a support member according to yet other example embodiments of the present disclosure.

FIG. 11 is a cross-sectional view of a supporting member according to yet other example embodiments of the present disclosure.

Referring to FIG. 11, a supporting member (e.g., a support) 50_7 of a display device 7 may be formed integrally with a mold frame 30. The adhesive member 80 for coupling the supporting member 50_7 with the mold frame 30 may be eliminated.

According to some example embodiments of the present disclosure, the supporting member 50_7 may be formed integrally with the mold frame 30 by bi-injection molding. Then, the coupling force between the supporting member 50_7 and the mold frame 30 is high, so that excellent durability can be achieved.

Although FIG. 11 shows that the recesses are formed only in the upper face 51_7 of the supporting member 50_7, this is merely illustrative. Recesses may be formed also in the side face 52_7 of the supporting member 50_7.

Figure 12:
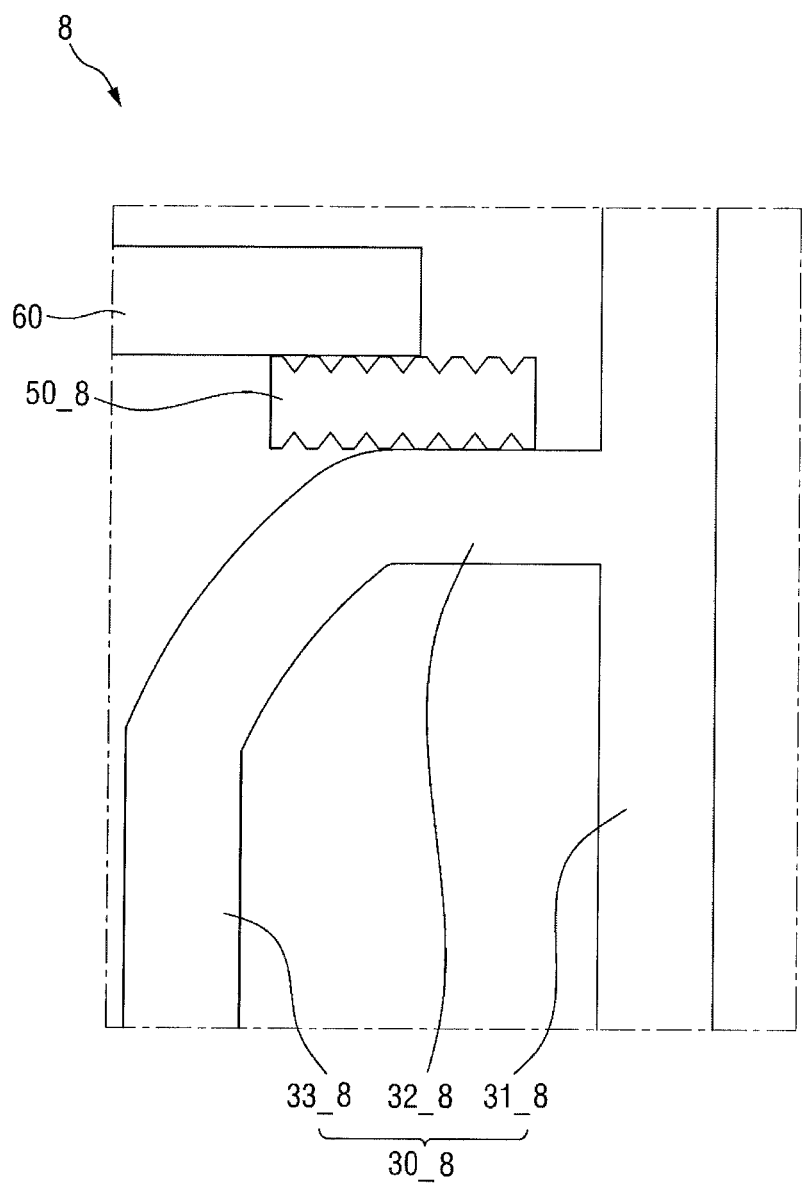
FIG. 12 is a cross-sectional view of a mold frame and a support member according to yet other example embodiments of the present disclosure.

FIG. 12 is a cross-sectional view of a mold frame and a supporting member according to yet other example embodiments of the present disclosure.

Referring to FIG. 12, a mold frame 30_8 of a display device 8 includes a first sidewall 31_8, a flat surface 32_8 vertically protruding from the first sidewall 31_8, and a second sidewall 33_8 extended downward from the flat surface 32_8.

A supporting member (e.g., a support) 50_8 may be disposed on the flat surface 32_8 of the mold frame 30_8. The supporting member 50_8 may have a square column shape and may include upper and lower surfaces, and side surfaces connecting between the upper surface and the lower surface.

The upper surface and the lower surface of the supporting member 50_8 may include optical patterns. It is, however, to be understood that the present disclosure is not limited thereto or thereby. The optical pattern may be formed only in the upper surface or the lower surface, or may be formed also in the side surface.

Although example embodiments of the present disclosure have been described, it is understood that the present disclosure is not limited to these example embodiments, but various changes and modifications can be made by one of ordinary skill in the art within the spirit and scope of the present disclosure as hereinafter claimed.

Therefore, the disclosed subject matter is not be limited to any single embodiment described herein, and the above-described embodiments are to be considered illustrative and not restrictive. Accordingly, the scope of the present inventive concept shall be determined only according to the attached claims, and equivalents thereof.

What is claimed is:

1. A backlight unit comprising:
a light source;
a mold frame configured to accommodate the light source and having a window frame shape with an opening therein; and
a support on the mold frame and comprising an optical pattern,
wherein the mold frame comprises a first sidewall, and an inclined surface protruding obliquely downward and inward from an inner side surface of the first sidewall, and
wherein the support is on the inclined surface of the mold frame.

2. The backlight unit of claim 1, wherein the support comprises an upper surface oriented vertically to the first sidewall of the mold frame, and an inclined surface extended obliquely downward and inward at a same inclination angle as the inclined surface of the mold frame.

3. The backlight unit of claim 2, wherein the optical pattern is formed in the upper surface and/or the inclined surface of the support.

4. The backlight unit of claim 3, wherein the optical pattern is formed by patterning at least one of the surfaces of the support.

5. The backlight unit of claim 3, wherein the optical pattern has a prism or a lenticular shape.

6. The backlight unit of claim 5, wherein the optical pattern is extended in a same direction as a direction in which the support is extended.

7. The backlight unit of claim 3, wherein a thickness of the support increases in a direction away from the first sidewall of the mold frame.

8. The backlight unit of claim 3, further comprising: a coupling member between the support and the inclined surface of the mold frame.

9. The backlight unit of claim 3, further comprising: an optical plate on the upper surface of the support.

10. The backlight unit of claim 9, wherein the optical pattern is formed in the upper surface of the support and is in direct contact with the optical plate.

11. The backlight unit of claim 10, wherein a portion of the optical pattern in contact with the optical plate is parallel to the optical plate.

12. The backlight unit of claim 1, wherein the support is made of a transparent material.

13. The backlight unit of claim 12, wherein the support contains scattering particles.

14. A display device comprising:
a display panel; and
a backlight unit below the display panel,
wherein the backlight unit comprises:
a light source;
a mold frame configured to accommodate the light source and having a window frame shape with an opening therein;
a support on the mold frame and comprising an optical pattern; and
an optical plate on the support,
wherein the mold frame comprises a first sidewall, and an inclined surface protruding obliquely downward and inward from an inner side surface of the first sidewall, and
wherein the support is on the inclined surface of the mold frame.

15. The display device of claim 14, further comprising:
a bottom cover below the light source,
wherein the support comprises an upper surface oriented parallel to a bottom of the bottom cover, and an inclined surface extended obliquely downward and inward at a same inclination angle as the inclined surface of the mold frame.

16. The display device of claim 15, wherein the optical pattern is formed in the upper surface and/or the inclined surface of the support.

17. The display device of claim 16, wherein the optical pattern is formed by patterning at least one of the surfaces of the support.

18. The display device of claim 17, wherein the optical pattern has a prism or a lenticular shape.

19. The display device of claim 18, wherein the optical pattern is formed in the upper surface and is in direct contact with the optical plate.

20. The display device of claim 14, wherein the support is formed integrally with the mold frame.

* * * * *